US010352474B2

(12) United States Patent
Gassman et al.

(10) Patent No.: US 10,352,474 B2
(45) Date of Patent: *Jul. 16, 2019

(54) FAILSAFE INTEGRATED TRANSDUCER

(71) Applicant: FISHER CONTROLS INTERNATIONAL LLC, Marshalltown, IA (US)

(72) Inventors: George W. Gassman, Marshalltown, IA (US); Curt Galbreath, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,903

(22) Filed: Jun. 30, 2017

(65) Prior Publication Data

US 2017/0299083 A1    Oct. 19, 2017

Related U.S. Application Data

(63) Continuation-in-part of application No. 14/660,685, filed on Mar. 17, 2015, now Pat. No. 9,726,299.
(Continued)

(51) Int. Cl.
*F16K 31/42* (2006.01)
*F16K 31/06* (2006.01)
*F15B 5/00* (2006.01)

(52) U.S. Cl.
CPC .............. *F16K 31/42* (2013.01); *F15B 5/003* (2013.01); *F15B 5/006* (2013.01);
(Continued)

(58) Field of Classification Search
CPC ........ F15B 7/003; F15B 5/003; F16K 31/042; F16K 31/0675; F16K 31/0672
See application file for complete search history.

(56) References Cited

U.S. PATENT DOCUMENTS 2,826,215 A    3/1958    Wolfslau
3,179,123 A    4/1965    Kowalski
(Continued)

FOREIGN PATENT DOCUMENTS

DE    44 15 068 A1    11/1995
DE    195 34 017 A1    3/1997
(Continued)

OTHER PUBLICATIONS

Search Report for PCT/US2015/021138, dated Nov. 10, 2015.
(Continued)

*Primary Examiner* — Eric Keasel
*Assistant Examiner* — Kevin R Barss
(74) *Attorney, Agent, or Firm* — Marshall, Gerstein & Borun LLP

(57) ABSTRACT

A transducer with a lower housing assembly and an upper housing assembly is for connection to a fluid pressure source having a mechanism for setting a pneumatic output via an electrical input signal. The lower housing assembly comprises lower housing configured to receive a supply nozzle, which fluidly communicates with a supply port and intermittently fluidly communicates with an output port of the lower housing through an internal fluid passageway. The lower housing further comprises an exhaust nozzle fluidly communicating with an exhaust port and intermittently fluidly communicates with the output port of the lower housing through the internal fluid passageway. The upper housing assembly comprises an upper housing configured to receive a coil and an armature such that the upper housing, coil and armature define a latching electromagnetic circuit that provides alternating contact of the armature with the supply nozzle and the exhaust nozzle of the lower housing assembly.

12 Claims, 13 Drawing Sheets

Related U.S. Application Data

(60) Provisional application No. 61/955,110, filed on Mar. 18, 2014.

(52) U.S. Cl.
CPC ...... *F16K 31/0603* (2013.01); *F16K 31/0624* (2013.01); *F16K 31/0672* (2013.01); *F16K 31/0675* (2013.01); *F16K 31/0682* (2013.01); *F15B 2211/8752* (2013.01); *F15B 2211/88* (2013.01); *Y02P 80/13* (2015.11)

(56) References Cited

U.S. PATENT DOCUMENTS

| | | | |
|---|---|---|---|
| 3,635,240 | A | 1/1972 | Vischulis et al. |
| 4,196,751 | A | 4/1980 | Fischer et al. |
| 4,569,504 | A * | 2/1986 | Doyle ............ H01F 7/1638 251/129.15 |
| 4,898,200 | A | 2/1990 | Odajima et al. |
| 5,105,791 | A | 4/1992 | Nye, Jr. |
| 5,452,742 | A | 9/1995 | Vidal et al. |
| 5,606,992 | A | 3/1997 | Erickson et al. |
| 5,699,824 | A | 12/1997 | Kemmler et al. |
| 5,957,393 | A | 9/1999 | Price |
| 6,129,002 | A | 10/2000 | Lisec et al. |
| 6,171,066 | B1 | 1/2001 | Irokawa et al. |
| 7,205,685 | B2 | 4/2007 | Reichert et al. |
| 7,650,903 | B2 | 1/2010 | Yamamoto |
| 7,762,523 | B2 | 7/2010 | Smith |
| 9,726,299 | B2 * | 8/2017 | Gassman ............ F16K 31/42 |
| 2002/0134957 | A1 | 9/2002 | Paessler et al. |
| 2005/0012060 | A1 | 1/2005 | Dzialakiewicz et al. |
| 2010/0051842 | A1 | 3/2010 | Mertens |
| 2013/0294623 | A1 | 11/2013 | Askew et al. |

FOREIGN PATENT DOCUMENTS

| | | |
|---|---|---|
| DE | 297 11 175 U1 | 7/1998 |
| EP | 0 870 958 A1 | 10/1998 |
| EP | 1403575 A2 | 3/2004 |
| EP | 1 651 896 A2 | 5/2006 |
| WO | WO-02/004851 | 1/2002 |
| WO | WO-03/102454 A1 | 12/2003 |

OTHER PUBLICATIONS

Written Opinion for PCT/US2015/021138, dated Nov. 10, 2015.
Office Action for Chinese Patent Application No. 201510117512.0, dated Apr. 2, 2018.
Office Action for Russian Patent Application No. 2016139918, dated Oct. 22, 2018.
International Search Report and Written Opinion for PCT/US2018/036382, dated Oct. 8, 2018.
International Search Report and Written Opinion for PCT/US2018/036390, dated Oct. 2, 2018.

\* cited by examiner

| CODE 16 | VOLTS (V) | CURRENT (ma) |
|---|---|---|
| ▨ | | |
| 0000 | -10 | -20 |
| 7CCC | -0.50 | -1.00 |
| 8000 | 0 | 0 |
| 8333 | 0.50 | 1.00 |
| A666 | 3 | 6 |
| FFFF | 10 | 20 |

FAILSAFE INTEGRATED TRANSDUCER

RELATED APPLICATIONS

This is a continuation-in-part of U.S. patent application Ser. No. 14/660,685 filed Mar. 17, 2015 entitled "Integrated Transducer" which is hereby incorporated by reference.

FIELD OF DISCLOSURE

The present disclosure relates to field instruments in process control systems, and more particularly, to electropneumatic converters for controlling a valve in a process control system.

BACKGROUND

Industrial processing plants use control valves in a wide variety of applications from controlling process flow in petroleum refineries to maintaining fluid levels in tank farms. Control valves, which are typically automated, are used to manage such fluid flow by functioning like a variable orifice or passage. By controlling an internal valve component, such as a valve plug, the amount of product passing through the valve body can be accurately regulated. The control valve is typically automated using a pressure-operated actuator that is controlled by a remotely-operated field instrument. The field instrument communicates with a process control computer to command fluid flow changes within the valve to achieve the plant operators' desired control strategy via pressure-operated actuators. Electropneumatic converters, such as current-to-pressure transducers, are in common use in field instruments to provide a conversion of an electrical signal to a volumetric flow or pressure output to control the actuator and, therefore, the control valve.

Current electropneumatic converters either provide continuous, proportional current-to-pressure conversion or provide intermittent or pulsed-mode current-to-pressure conversion. Existing continuous conversion electropneumatic converters consume or bleed air constantly during operation. High air consumption is undesirable in certain applications such as when the fluid supply to the field instrument and the electropneumatic converter is process media like natural gas. For example, the costs associated with providing additional capacity in the fluid supply system can be substantial. Additionally, the constant bleed of such process media is both expensive and wasteful to the environment. Alternatively, current pulsed-mode electropneumatic converters are typically based upon either piezoelectric technologies or multiple solenoid configurations. Piezoelectric designs, such as known designs provided by Hoerbiger Gmbh of Altenstadt, Germany, may be extremely power consumptive and relatively expensive to implement. Further, piezoelectric designs are temperature limited due the fact that the piezoelectric effect begins to degrade below approximately −20 Celsius. Additionally, multiple solenoid designs are complex and can be expensive to manufacture due to replication of the electromagnetic circuit.

SUMMARY

A first aspect of the present disclosure provides a lower housing assembly and an upper housing assembly. The lower housing assembly comprises a lower housing configured to receive a supply nozzle. The supply nozzle fluidly communicates with a supply port and intermittently fluidly communicates with an output port of the lower housing through an internal fluid passageway. The lower housing further comprises an exhaust nozzle fluidly communicating with an exhaust port and intermittently fluidly communicates with the output port of the lower housing through the internal fluid passageway. The upper housing assembly comprises an upper housing configured to receive a coil and an armature such that the upper housing, coil and armature define a latching electromagnetic circuit that provides alternating contact of the armature with the supply nozzle and the exhaust nozzle of the lower housing assembly.

A second aspect of the present disclosure provides a pneumatic circuit and an electromagnetic circuit. The pneumatic circuit comprises a lower housing having a supply port, an exhaust port and an output port in fluid communication through an internal fluid passageway and a pressure chamber. The electromagnetic circuit comprises an upper housing configured to receive a coil and an armature such that the armature is movable in response to an electrical input signal and the electromagnetic circuit defines a spring force moment and a magnetic force moment. The spring force moment and the magnetic force moment cooperate to alternatively latch the armature immediately adjacent to and nonadjacent to the upper housing.

In a third aspect of the present disclosure an electropneumatic switch valve comprising a pneumatic circuit, an electromagnetic circuit and a control module. The pneumatic circuit is coupled to a pressurized fluid source and the electromagnetic circuit is coupled to the pneumatic circuit. The control module is connected to the electromagnetic circuit and provides a first control signal inducing a first state of the pneumatic circuit, a second control signal inducing a second state of the pneumatic circuit, a third control signal inducing a third state of the pneumatic circuit and a fourth control signal inducing a fourth state of the pneumatic circuit.

DETAILED DESCRIPTION

Figure 1:
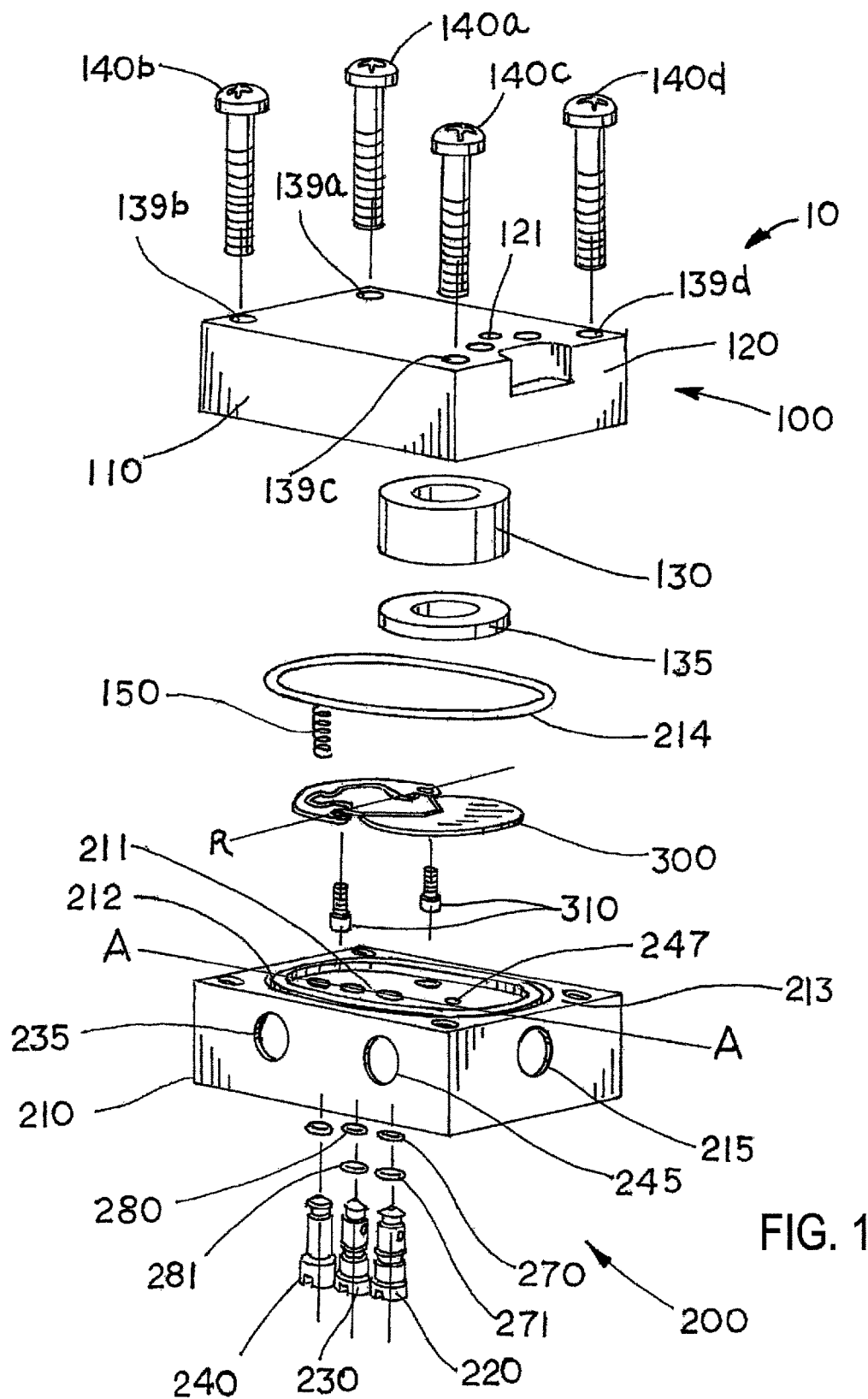
FIG. 1 is an exploded, perspective view of an example transducer constructed in accordance with the principles of the present disclosure.

For the purposes of promoting an understanding of the principles of the present disclosure, reference will now be made to an example embodiment and variations thereof illustrated in the drawings and specific language used to describe the same. It will nevertheless be understood that no limitation of the scope of the disclosure is thereby intended, and such alterations and further modifications in the illustrated device and such further applications of the principles of the disclosure as illustrated as would normally occur to one skilled in the art to which the disclosure relates are included.

Electropneumatic field instruments provide for the conversion of an electrical signal into a volumetric flow or pressure output to couple an independent electrical command signal to a dependent pneumatic pressure signal via pressure transducer. Accordingly, there is provided a pneumatic pre-stage, namely a transducer, and more particularly a Latching Pneumatic Transducer (LPT), for a connection to a fluid pressure source comprising a mechanism for setting a pneumatic output by way of an electrical input signal. The pneumatic output (i.e. fluid pressure) of the example LPT may be supplied to a pneumatic main stage, namely a pneumatic amplifier, (e.g. a relay or a spool valve) before being supplied to the working chamber of an actuator. In accordance with the example LPT, the mechanism of the transducer is designed to generate a latching, non-continuous pneumatic output signal from a single electrical input signal; functioning as an electropneumatic switch valve.

Referring now to FIGS. 1, 2, 3 and 4, a Latching Pneumatic Transducer (LPT) 10 comprises an upper block assembly 100 and a lower block assembly 200. An upper block assembly includes the upper block or housing 110, the coil 130, the bias spring 150 and the armature 300 including armature fasteners 310 to define an electromagnetic circuit of the example LPT 10. The upper block 110 is preferably a rectangular cuboid including an annular coil recess 111 formed from a first cylindrical cavity 112 having a concentric cylindrical core 114 configured to receive the coil 130. A first distal end 120 of the upper block 110 includes an electrical feed through 121 to receive a pair of electrical leads (not shown) of the coil 130. The upper block 110 further includes a second cylindrical cavity 122 forming a spring recess to receive the bias spring 150. A raised armature mounting boss 151 provides a mounting surface for the armature 300 including an annular travel stop 152 that circumscribes the annular coil recess 111. A coil seal 135 may be placed immediately adjacent to a first end 138 of the coil 130 to form a fluid seal to prevent contact of a supply fluid with the coil 130. Multiple fastener holes 139a-d are provided at the corners of the upper block 110 to receive fasteners 140a-d that couple the upper block 100 assembly to a lower block assembly 200.

Figure 3:
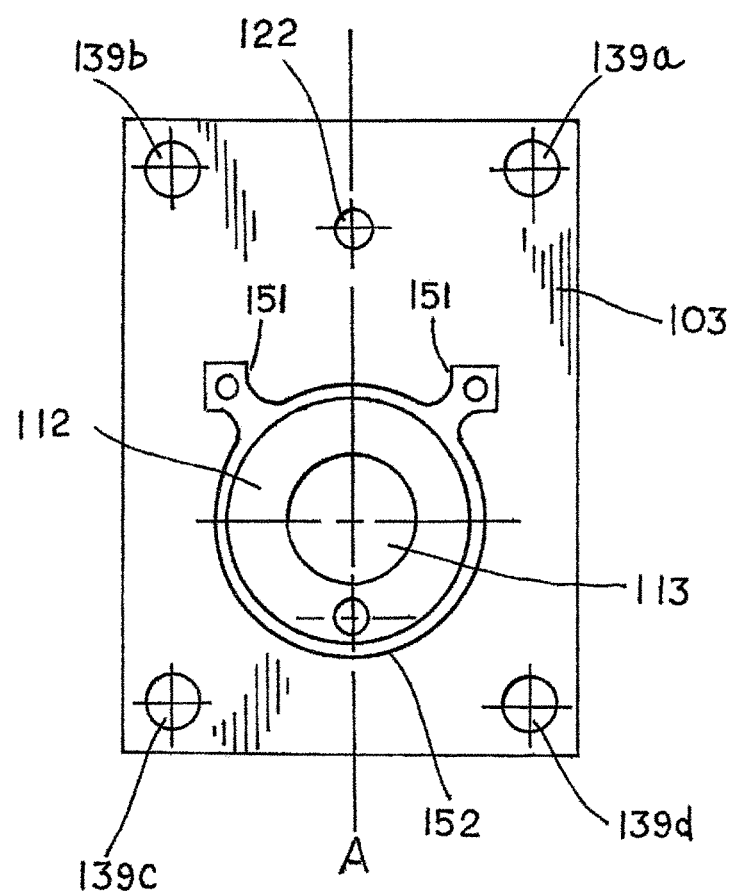
FIG. 3 is a planar view of an upper block of an example transducer constructed in accordance with the principles of the present disclosure.

As an example, the preferable length, width and height of the upper block 110 is 1.000 inches, 1.060 inches, and 0.385 inches, respectively with the upper block 110 preferably fabricated from low magnetic hysteresis material such as Carpenter Hi Perm 49 with corrosion passivation such as electroless nickel plating from Atotech USA of Rock Hill, S.C. having a layer in the range of 4 to 6 microns and preferably 5 microns. Further, the upper block 110 may be fabricated preferably using known machining techniques from bar stock or manufactured using Metal Injection Molding techniques. Additionally, alternative passivation could include a Parylene C coating from Parylene Coating Service of Katy, Tex. or a Ballinit® coating from Oerlikon Balzers Coating of Schaumburg, Ill. An outer diameter of the annular coil recess 111 is preferably 0.555 inches and an inner diameter formed by the cylindrical core 114 being preferably 0.291 inches is positioned 0.913 inches from a second distal end 136 along a central axis, A, with electrical feed through 121 being proximate to the coil annular recess 111 and preferably having a diameter of 0.053 inches along axis A and located 0.310 inches from the first distal end 120. The bias spring recess 124 is preferably 0.094 inches in diameter and 0.180 inches in depth being positioned 0.246 inches from the second distal end 136. As depicted in FIG. 3, the raised annular travel stop 152 is preferably a planar annular raised face having an outer dimension of 0.625 inches and an inner dimension of 0.555 inches further incorporating two raised armature mounting bosses 151 to cooperatively receive 0-80 fasteners to secure the armature to the upper block 110. The dimensions listed herein for the example LPT 10 are merely examples and other devices constructed in accordance with the principles of the present disclosure could be constructed with different dimensions and having different ratios of dimensions.

As described in greater detail below, the motive force that causes the armature to move during operation of the example LPT 10 is caused by the attraction and repulsion induced by an electromagnet formed within the coil 130 of the upper block 110. The coil 130 of the example LPT 10 is preferably a fabricated by employing hot air adhesion and is bobbinless, preferably 0.239 inches in length having an outer diameter of 0.625 inches and an inner diameter of 0.555 inches. The magnet wire used to construct the coil is preferably 42 AWG and comprises 3100 turns providing a coil resistance of preferably 600 ohms.

Figure 2:
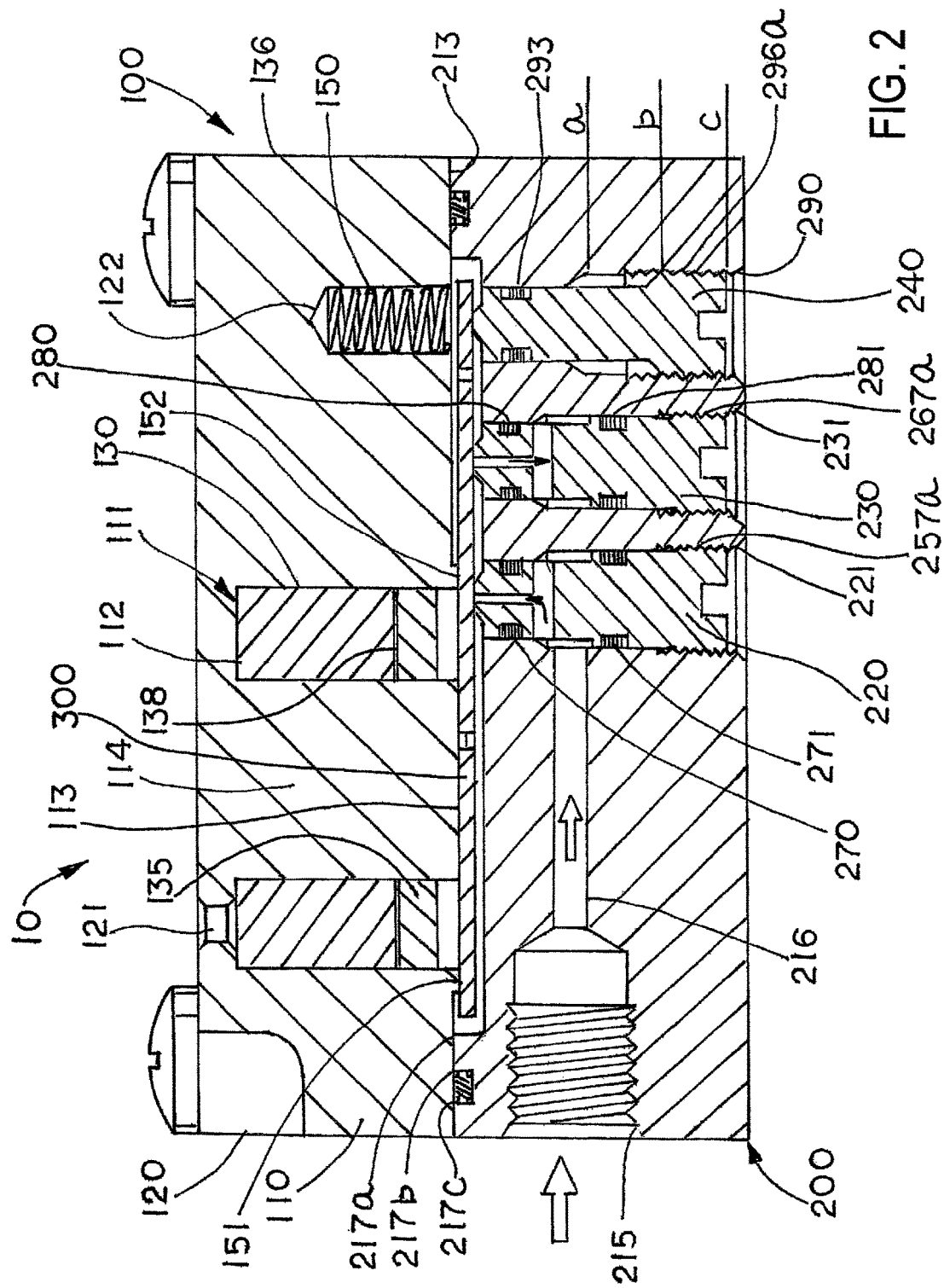
FIG. 2 is a cross-sectional view of an example transducer constructed in accordance with the principles of the present disclosure.

Continuing with reference to FIGS. 1 and 2, the lower block assembly 200 includes a lower block or housing 210; a supply nozzle 220; an exhaust nozzle 230; and a bias spring adjustment screw 240. The lower block 210 is preferably a rectangular cuboid including a recess forming a "race track-shaped" or obround chamber 211 circumscribed by an obround seal recess 212 formed on a generally planar surface of an inner face 213 of the lower block 210. An obround seal 214, such as an O-ring seal, may be placed in the obround seal recess 212 to prevent supply fluid loss between the upper block 100 and lower block 200. The lower block 200 further defines internal fluid manifolds or passageways for fluid communication within the example LPT 10 thereby describing a pneumatic circuit of the example LPT 10.

Figure 4:
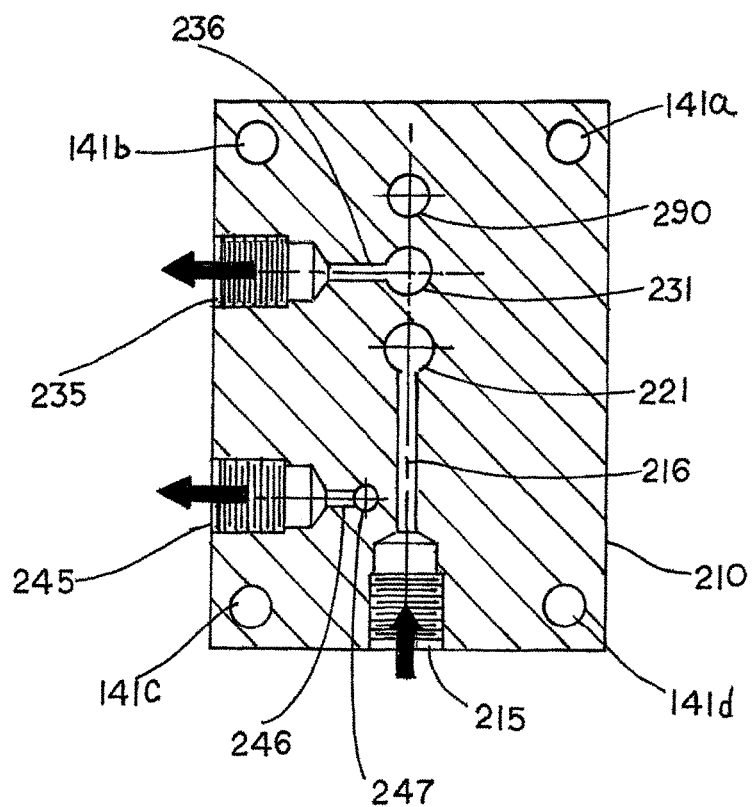
FIG. 4 is a planar view with cross-section of a lower block of an example transducer constructed in accordance with the principles of the present disclosure.

Referring now to FIGS. 2 and 4, the internal manifolds within the lower block 210 are configured to receive a pressure supply connection (not shown), the supply nozzle 220, exhaust nozzle 230 and a bias spring adjustment screw 240. More particularly, a supply port 215 is provided to threadably receive a connector to couple the example LPT 10 to a supply pressure source (not shown), such as process plant instrument supply air is a range of approximately 20 psig to 150 psig, as preferably 20 psig. The supply port 215 connects to a supply port bore 216 that is in fluid communication with the supply nozzle 220. A supply nozzle receiver 221 is configured to threadably receive the supply nozzle 220. The lower block 210 further includes an exhaust port 235 (FIG. 1) transversely located from the supply port 215 and is configured to threadably receive a connector (not shown) which may couple the example LPT 10 to an exhaust conduit (not shown). The exhaust port 235 connects to an exhaust port bore 236 that is in fluid communication with the exhaust nozzle 230. An exhaust nozzle receiver 231 is configured to threadably receive the exhaust nozzle 230. The lower block 210 also includes an output port 245 (FIG. 1) transversely located from the supply port 215 and in fluid communication with the supply port 215 and the exhaust port 235 via the obround chamber 211 through an output bore 246 and the chamber output port 247.

The preferable length and width of the lower block are 1.000 inches and 1.060 inches, respectively, and having a height or thickness of 0.440 inches with the lower block 210 preferably fabricated from 316 Stainless Steel. Further, the lower block 210 may be fabricated preferably using known machining techniques from bar stock or manufactured using Metal Injection Molding techniques. The obround chamber 211 and obround seal recess 212 are formed by fashioning three concentric ellipses 217a-c on the inner face 203 having radii of 0.375 inches, 0.425 inches, and 0.475 inches on a centerline axis, A, with the obround chamber 211 and the obround seal recess 212 have a depth of preferably 0.045 inches and 0.028 inches, respectively. Multiple fastener holes 141 a-d are provided at the corners of the lower block to threadably receive fasteners that couple the upper block assembly 100 to a lower block assembly 200. The supply nozzle receiver 221 and the exhaust nozzle receiver 231 have a stepped, cylindrical configuration that is preferably 0.114 inches diameter for a depth of 0.095 inches in section a; 0.134 inches diameter for a depth of 0.300 inches in section b; 0.142 inches diameter for a depth of 0.157 inches in section c. Further, there is preferably a 60 Degree chamfer between section a and b and section b and c and a 90 Degree chamfer that terminates the supply nozzle receiver 221 and the exhaust nozzle receiver 231 at a terminal end 232 of section c.

Figure 5:
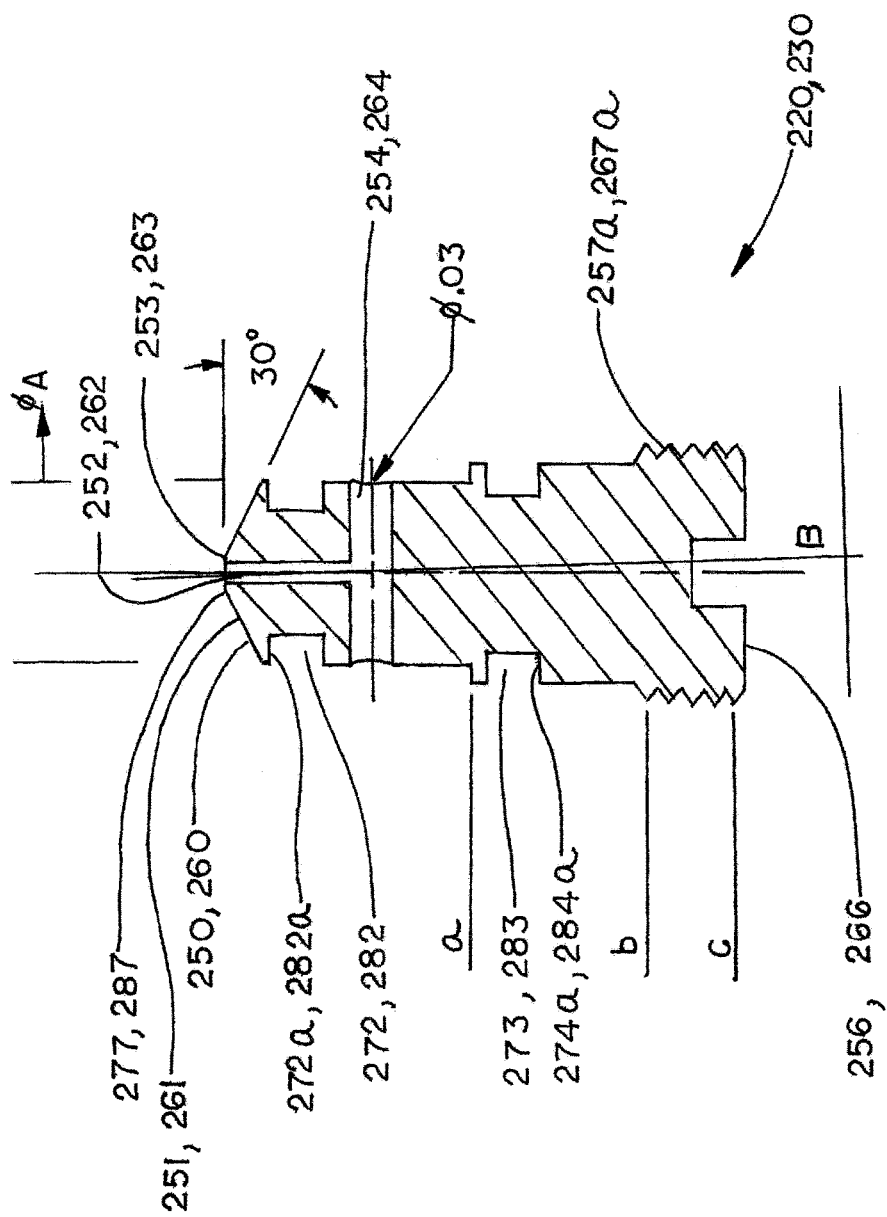
FIG. 5 is a cross-sectional view of a supply nozzle and an exhaust nozzle of an example transducer constructed in accordance with the principles of the present disclosure.

Continuing with reference to FIG. 5, although the supply nozzle 220 and the exhaust nozzle 230 of the example LPT10 are of substantially similar construction as described below, one of ordinary skill in the art will appreciate that such nozzles could deviate from the ensuing dimensions or configuration without departing from the spirit and scope of the example LPT 10. Further, in this descriptive section a reference to nozzle means either/or supply nozzle 220 and exhaust nozzle 230. A first distal end 250, 260 of the nozzle 220, 230 terminates in a frusto-conical surface 251, 261 having a nozzle bore 252, 262 terminating in a nozzle orifice 253, 263 which is in fluid communication with a transverse bore 254, 264 of the nozzle 220, 230. An upper and lower nozzle seal 270, 280 and 271, 281 may be placed in an upper and lower seal recess 272, 282 and 273, 283 to seal and direct the fluid supply from the supply port bore 216 and the exhaust port bore 236, respectively, through the transverse bore 254, 264 and into the nozzle bore 252, 262. A second distal end 256, 266 may include a threaded portion 257a, 267a to engage a corresponding threaded portion 257b, 267b of the supply nozzle receiver 221 and the exhaust nozzle receiver 231, respectively. The supply nozzle 220 is used to direct the fluid supply from the supply source into the obround chamber 211 in the example LPT 10 and out through the output port 245 and the exhaust nozzle 230 is used to direct the fluid supply from the obround chamber 211 to the exhaust port 235, as described in greater detail below.

Figure 6:
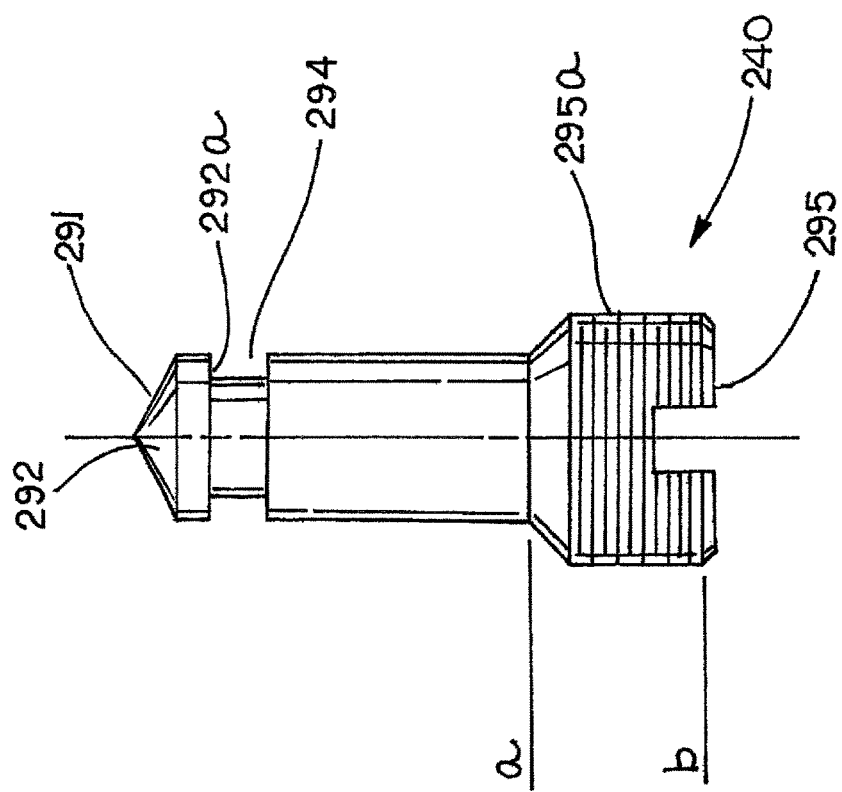
FIG. 6 is a cross-sectional view of a bias adjustment screw of an example transducer constructed in accordance with the principles of the present disclosure.

As depicted in FIGS. 2 and 6, the lower block assembly 200 also includes a bias spring adjustment screw receiver 290 to threadably receive a bias spring adjustment screw 240. A first distal end 291 of the bias spring adjustment screw 240 terminates in a conical surface 292. Further, an upper adjustment screw seal 293 may be placed in an upper adjustment screw seal recess 294 to prevent fluid loss from the obround chamber 211. A second distal end 295 may include a threaded portion 295a to engage a corresponding threaded portion 296a of the adjustment screw receiver 290.

The supply nozzle 220 and the exhaust nozzle 230 have a stepped, cylindrical configuration that is preferably 0.110 inches diameter for a length of 0.179 inches in a first section a; 0.130 inches diameter for a length of 0.120 inches in a second section, section b; 0.142 inches diameter for a depth of 0.081 inches in a third section c with section c preferably including M4×0.35 threads for 0.081 inches in length. The supply nozzle 220 and the exhaust nozzle 230 may be preferably fabricated from 316 Stainless Steel. Further, the supply nozzle 220 and the exhaust nozzle 230 may be fabricated preferably using known machining techniques from bar stock or manufactured using Metal Injection Molding techniques. There is preferably a 30 Degree chamfer at a distal end 250, 260 of the nozzle 220, 230. The upper nozzle seal recess 270, 280 is preferably 0.039 inches in height and having an inner diameter of 0.075 inches including an upper nozzle seal surface 272a, 282a preferably 0.032 inches from the distal end 250, 260 of the nozzle. The lower nozzle seal recess 273, 283 is preferably 0.039 inches in height and having an inner diameter of 0.095 inches including a lower nozzle seal surface 274a, 284a preferably 0.190 inches from the distal end 250, 260 of the nozzle 220, 230. The nozzle bore 252, 262 is preferably 0.0135 inches in diameter and extends along a longitudinal axis, B, of the nozzle 220, 230 to intersect the transverse nozzle bore 254, 264 having a preferable bore diameter of 0.030 inches and located 0.107 inches from the distal end 252, 262. Further, a landing of the nozzle 220, 230 will contact the armature 300, as described in greater detail below, and is preferably 0.020 inches in diameter located along the longitudinal axis and having a preferable perpendicularity offset of 0.0005 inches with respect to a cylinder defined by the diameter of section a of the supply and exhaust nozzle 220, 230 along the longitudinal axis, B, as depicted in FIG. 5 as ☐A.

The preferable dimensions of the bias adjustment screw 240 are as follows. The bias adjustment screw 240 has a stepped, cylindrical configuration that is preferably 0.104 inches diameter for a length of 0.238 inches in section a; 0.142 inches diameter for a length of 0.122 inches in section b; with section b preferably including M4×0.35 threads for 0.081 inches in length. Further, there is preferably a 30 Degree chamfer at a distal end 291 and the upper seal recess 294 is preferably 0.039 inches in height and having an inner diameter of 0.075 inches including an upper seal surface 292a preferably 0.051 inches from the distal end 291.

Figure 7:
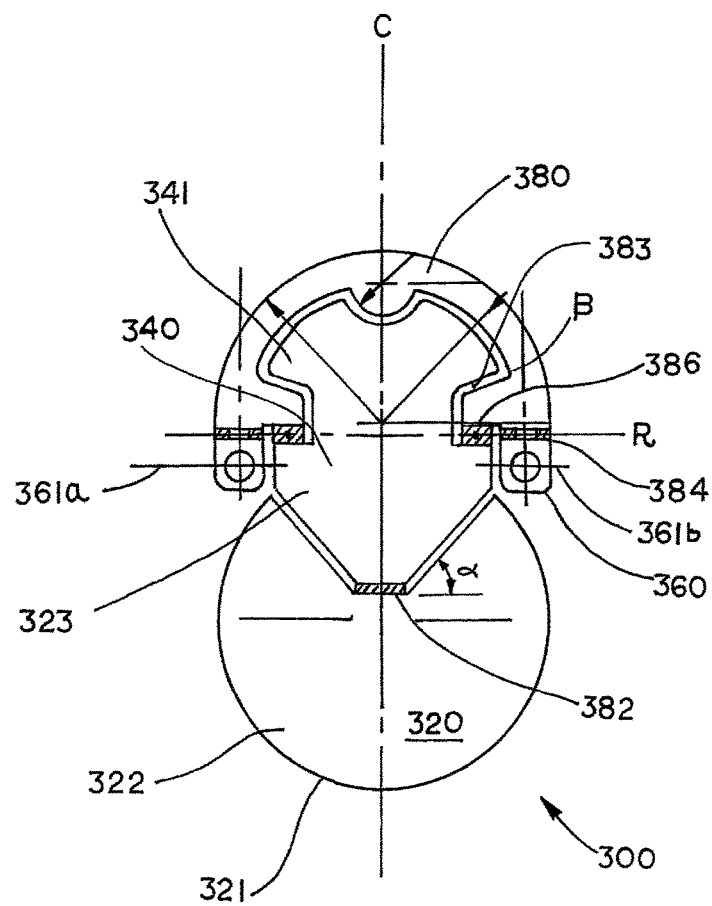
FIG. 7 is a planar view of an armature of an example transducer constructed in accordance with the principles of the present disclosure.

Referring now to FIG. 7, the armature 300 of the example LPT 10 is fabricated from a single, continuous sheet of metal integrating a tractive portion 320; a capping portion 340; a mounting portion 360; an E-clip portion 380; a stress relief hinge 382; a bias hinge 384; a capping hinge 386. The armature 300 preferably is generally obround-shaped when viewed in the plan view of FIG. 7, and preferably includes reliefs in the structure (when viewed in cross-section) to form the pivots or hinges and the portions listed above. That is, the tractive portion 320 is formed at a first end 321 of the armature 300 having a generally circular-shaped section 322 including a sector 323 separated from the circular-shaped section 322 in the form of an irregular hexagon. The sector 323 is hinged to the tractive portion 320 by the stress relief hinge 382. As further depicted in FIG. 7, the capping portion 340 is generally formed from the sector 323 appended to a keyhole-shaped section 341 including reliefs in the structure to form a bias hinge 384 and a capping hinge 386 that operatively couple the capping portion 340 to the E-clip portion 380 described in further detail below. The E-clip portion 380 provides the main bias force of the armature 300 necessary to create the bi-stable or latching action of the example LPT 10. That is, the armature 300 includes recesses that define a horizontal axis of rotation, R, for the armature 300. The flexure created by the recesses (e.g. the pivot) form an angular spring that works in cooperation with the bias spring 150 to provide an operational return force, as described in additional detail below. An alternate design could utilize only the armature spring without the need for an additional bias spring 150.

With continuing reference to FIG. 7, the tractive portion 320 is attached to the capping portion 340 through the stress relief hinge 382. In operation, the stress relief hinge 382 introduces a force vector generated in the tractive portion 320 via application of a DC current to the electrical leads of the coil 130. A magnetic field generated by application of the DC current within the coil 130 creates an electromagnet about the cylindrical core 114. The electromagnetic forms a corresponding magnetic force, and therefore a corresponding moment of force, at a Rotation Axis, R, attracting the tractive portion 320 of the armature 300 towards the cylindrical core 114; contacting the annular travel stop 152.

Specifically, the actuation moment induced by the DC current overcomes the bias moment presented by the E-clip portion 380, which causes the tractive portion 320 and the capping portion 340 to move about the Rotation Axis, R, towards the coil 130-contacting the annular travel stop 152. The tractive portion 320 and the capping portion 340 will stay in contact with the annular travel stop 152 (i.e. latching the position of the armature) as long as the actuation moment is of greater magnitude than the bias moment trying to lift the tractive portion 320 away from the coil 130 and the annular travel stop 152. During such operation, the DC current to the coil is continuously supplied to maintain the magnetic force, which keeps the magnetic circuit closed and the armature 300 attracted towards the cylindrical core 114, which will be explained in further detail below.

Alternatively, an absence or removal of coil current will cause the magnetic tractive force and corresponding magnetic moment to decrease below the bias moment applied to the tractive portion 320 and the capping portion 340, at which time the tractive portion 320 will release from the annular travel stop 152 and the capping portion 340 and tractive portion 320 will toggle to a position away from the coil 130. Such toggling motion of the armature 300 provides alternating contact with supply nozzle orifice 253 and the exhaust nozzle orifice 263 to modulate flow through example LPT 10. Besides providing a connection between the tractive portion 320 and the capping portion 340 for the purpose of transmitting force, the stress relief hinge 382 also serves as a means to allow the tractive portion 320 area to align with the face of the coil in the event that small alignment errors between the coil face 132 and the armature tractive portion 320 are present. Such errors can result from machining tolerance errors in the obround chamber 211 or from an undesirable distortion or warp in the armature 300. The capping portion 340 is a rigid area that is suspended by the capping portion hinge 386 and is the portion of the armature 300 that provides the displacement to alternately contact the supply nozzle 220 and the exhaust nozzle 230 during operation. The capping portion hinge 386 constrains the capping portion 340 to angular motion about the Rotation Axis, R. As described above, the supply nozzle 220 and the exhaust nozzle 230 have a preferable perpendicularity offset of 0.0005 inches. Such offset provides substantially reduced leakage at a contact area defined by the nozzle orifice 253, 263.

To provide an adjustment means to achieve a consistent operating threshold from device to device, an adjustable bias moment is provided through the E-clip portion 380. This bias moment is applied on the capping portion at the Rotation Axis, R, and works in opposition to the magnetic moment to affect the release of the tractive portion 320 from the coil 130 and the annular travel stop 152. A bias adjustment screw 240 provides a static adjustment that makes the toggle or bi-stable operation of the armature occur at the desired levels of coil current. The bias moment is generated by the E-clip portion 380, the bias adjustment screw 240, the bias spring 150, the bias hinge 384, and the capping portion hinge 386. To set the bias moment at the correct level, the bias spring adjustment screw 240 is rotated to the point where toggle operation of the armature 300 occurs as the armature 300 is operated between coil current operating points. Rotation of the bias spring adjustment screw 240 causes a displacement at the tip of the bias spring adjustment screw 240 resulting in a change in the angular displacement of the E-clip portion 380 as the E-clip portion 380 is rotated about the Rotation Axis, R, determined by the four hinges portions described above.

The resulting change in angle of the E-clip portion 380 causes a corresponding change in the bias angle presented to the capping portion hinges 386. This angle corresponds to a preload or wind-up moment applied to the capping portion 340 about the Rotation Axis, R. In this way, adjustment of the bias spring adjustment screw 240 results in an adjustment of the bias moment applied to the capping portion 320 and provides a means of "zeroing" or offsetting the capping portion 320 for desired operation. The bias preload spring 150 is used to provide a load on the second surface of the armature 300 sufficient to keep the E-clip portion 380 in constant contact with the distal end 291 of the bias spring adjustment screw 240. In an alternate example LPT 10, the preload bias spring 150 could be eliminated from the design as the preload provided by the E-clip portion 380 may be sufficient to maintain contact with the end of the bias spring adjustment screw 240. Also, the bias spring adjustment screw 240 could be subsequently eliminated from the example LPT 10 and replaced with a fixed protrusion of controlled height to provide for a uniform E-clip portion angle.

The armature 300 may be fabricated from material possessing low magnetic hysteresis properties having a thickness of preferably 0.020 inches thick and the reliefs forming the bias hinge 384, capping hinge 386, and stress relief hinge 382 being preferably 0.0063 inches thick. The armature 300 may be preferably fabricated from a low magnetic hysteresis or soft magnetic metal such as ASTM 753A Alloy 2 from Carpenter Technology Corporation with corrosion passivation such as electroless nickel plating from Atotech USA of Rock Hill, S.C. having a layer in the range of 1 to 3 microns and preferably 2 microns. Additionally, alternative passivation could include a Parylene C coating from Parylene Coating Service of Katy, Tex. or a Ballinit® coating from Oerlikon Balzers Coating of Schaumburg, Ill. or an ALD coating from Sundew Technologies of Broomfield, Colo. By matching the materials of construction of the armature 300, the upper block assembly 100, and the lower block assembly 200, the example LPT can operate at approximately +85 Celsius to −60 Celsius due to matching thermal expansion co-efficient (e.g. a preferred thermal expansion co-efficient 12.2 μm/m° C.).

The tractive portion 320 preferably has a circular cross-section of 0.344 inches radius including an 84 degree sector 322, α, separated by 0.018 inches. The E-clip portion 380 preferably has an outer radius 0.344 inches and an inner 0.284 inches, respectively. The tab portion of the E-clip portion 380 has a radius of 0.064 inches located along a center axis, C, of the armature 300 on a radius of 0.280 inches, preferably. The capping portion 340 outer perimeter correspondingly matches the inner perimeter of the E-clip portion 380 preferably having a separation distance of 0.018 inches from the counterpart E-clip portion 380 with the mounting portion 360 having through holes of 0.061 inches equidistant from the center axis, C, and spaced at 0.584 inches. The angled portion 383 of the E-clip portion 380 is preferably 18 degrees, β. The reliefs forming the bias hinge 384 are preferably 0.030 inches by 0.020 inches with the associated stress relief hinge 382 being preferably 0.100 inches by 0.020 inches. The reliefs forming the capping hinge 386 are preferably 0.060 inches by 0.035 inches. Additionally, the two holes 361a-b in the armature 300, shown in FIG. 7, form an integrated mounting surface of the armature 300. During assembly, the armature fasteners 310 pass through the armature mounting holes threadably engaging the lower block 200.

Figure 8:
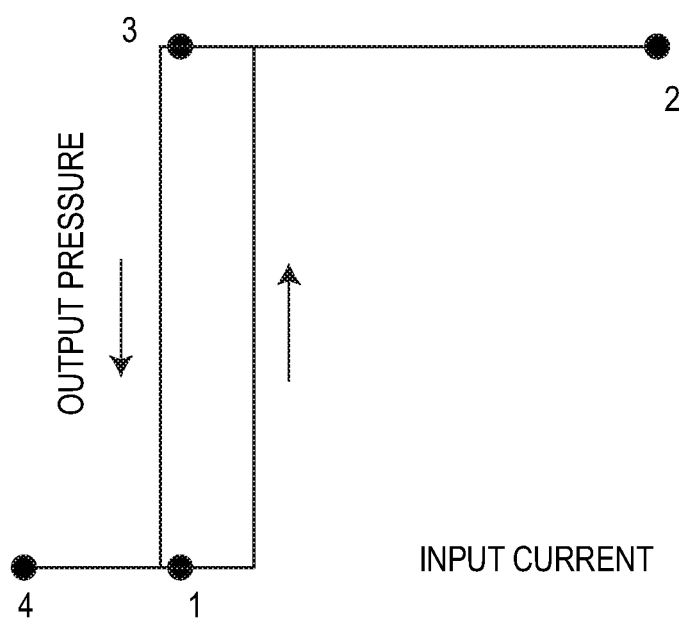
FIG. 8 is a state diagram of the operational characteristics of an example transducer constructed in accordance with the principles of the present disclosure.

The subsequent operational description is made with reference to the previously described example LPT 10, FIG. 1 through 4. As now depicted in FIGS. 8 and 9A, the example LPT has four (4) conditions that define its operational states: State 1; State 2; State 3 and State 4. As explained in greater detail below, State 1 and State 3 are quiescent (i.e., dormant) conditions of the example LPT 10 and State 2 and State 4 are non-quiescent (i.e. non-dormant) conditions. In State 1, the input signal through the electrical leads is zero (0) mA (i.e. zero power) and the armature 300 of the example LPT 10 is rotated slightly counterclockwise around the Rotation Axis R when viewing to FIG. 2 so that a small air gap is produced between a planar surface 113 of the coil 130 and the armature 300 (i.e. non-adjacent to the planar surface 113). In the disclosed example the air gap is approximately 0.0055 inches. The counterclockwise rotation is cause by a moment produced by the bias spring force and the gap is limited by an adjustment of the supply nozzle 220, which serves as a travel stop of the additional counterclockwise rotation by the armature 300. In State 1, the orifice of the supply nozzle 220 is contacted or capped by the armature capping portion 340 and the orifice 262 of an exhaust nozzle 230 is opened by a gap between the exhaust nozzle 230 and the capping portion 340 of the armature 300. The pressure at an output port 245 of the example LPT 10 is fluid communication with the exhaust port 235 in State 1, and as such, will decrease to the exhaust pressure level, such as atmospheric pressure resulting in a quiescent fluid flow, as illustrated by flow arrows depicted in FIGS. 2 and 4, through the example LPT 10 that will be zero (0) or substantially zero (0). The pressure of the output port 245 will necessarily be at the exhaust pressure level in this operational State 1 and will remain latched at such pressure due to a latching force created by the E-clip portion 380 until a non-zero electrical input signal is supplied to the electrical leads. The electrical power consumption of the example LPT 10 in State1 is zero (0) mW or a "zero power" condition since no electrical power is applied. That is, in comparison to continuous, proportional transducers, the example LPT 10 modulates both supply nozzle 220 and exhaust nozzle 230 in an opposing or alternating manner that substantially eliminates quiescent bleed flow (i.e. a constant bleed of supply air) through the example LPT 10.

To affect a change in the output pressure, the example LPT 10 must transition from State1 to State2. That is, State2 of the example LPT 10 is a transition state and is produced by applying a non-zero Direct Current (DC) signal or non-zero power to the electrical leads of the coil 130 thereby energizing or activating the example LPT 10. As a DC current, such as +4 millampere (mA), is applied to the coil 130, a magnetic field is established thereby magnetizing the core 114 and a sleeve of the example LPT 10 formed by the annular travel stop 152, which produces a magnetizing force (i.e. an attractive force) immediately adjacent to the armature 300. As the DC current is applied, magnetic force may become sufficient to overcome or exceed the sum of a spring moment of the armature 300 formed by the E-clip portion 380 described above and a contact moment of the supply nozzle 220, which cause the armature 300 to rotate with respect to Rotation Axis, R. Relative to FIG. 2, the armature 300 will rotate in a clockwise direction. Armature rotation will continue until the armature 300 makes contact with annular travel stop 152 (i.e. immediately adjacent to the planar surface 113). State 2 is defined by the fully opened position of the supply nozzle 220 orifice and the closure of the exhaust nozzle 230 orifice under electrical power sufficient to move the armature 300 as previously described placing the output port 245 in fluid communication with the supply port 215 placing the supply pressure at the output port 245. It should be appreciated that the closure of either the supply nozzle 220 or the exhaust nozzle 230 is not "bubble tight". That is, upon closure of either the supply nozzle orifice 252 or the exhaust nozzle orifice 262, there may be a slight or negligible leak path between the orifi 252, 262 and the armature 300. However, in State 2 the volumetric flow (i.e. flow induced by a positive pressure gradient from fluid communication from an opened supply port and a closed exhaust port) from the supply nozzle 220 greatly exceeds the negligible leak at the exhaust nozzle 230 thereby increasing the fluid pressure at in the chamber and in the output port 245 to substantially equal input port 215 supply pressure such as twenty (20) psig. The electrical power consumption in State 2 is non-zero due to the application of the 4 mA activation current.

Upon application of State 2 activation signal and the resulting transition to a new output pressure state, the example LPT 10 transitions to operation State 3. State 3 of the example LPT 10 utilizes the magnetic materials properties of the core and sleeve assembly as well as the armature, to latch or hold the final position of the State 2 activation. That is, in State 3, the magnetic force created and sustained by the activation current, in conjunction with the magnetic properties of the example LPT 10 form a magnetic remanence in State 3 fundamental to the bi-stable operation of the apparatus. Specifically, the attractive force of the electromagnetic circuit overcomes the spring force moment of the E-clip portion 380 and the spring's initial force to hold the armature in place after State 2 activation. The magnetic force produces a clockwise moment about the Rotation Axis, R, which exceeds the counterclockwise moment produced by the spring and all other operative moments and holds the armature to the face of the core 114 and sleeve formed by the annular travel stop 152. In State 3, the armature is said to be latched. State 3 maintains the output pressure of the output port 245 at substantially supply pressure. The armature of the example LPT 10, and therefore the output pressure, may remain in the defined condition until an input signal change at the electrical leads is applied or in absence of the input signal (i.e. loss of power).

The final operational condition is State 4, which corresponds to changing the pneumatic output from supply pressure to exhaust pressure (e.g. atmospheric pressure). To initiate a transition from State 3 to State 4, the magnitude and "direction" of the DC current must be changed. That is, the DC current is reversed from the sense of direction with respect to the DC current applied in State 2. In general, as the DC current, such as 0 mA, is applied to the coil via the electrical leads, a magnetic field is established around the coil inapposite to the magnetizing force of State 2 which overcomes or defeats the remanence established in State 2 thereby de-energizing or deactivating the example LPT 10. As the remanence is overcome in the electromagnetic circuit, the spring moment described above drives the armature 300 in a counterclockwise direction relative to the Rotation Axis, R. The armature 300 moves in that relative direction until to contacts a travel stop formed by a distal end 250 of the supply nozzle 220 effectively capping off or closing the supply port. In State 4, the pressure in the output chamber and therefore the output port 245 decays to the exhaust pressure (i.e. flow induced by a negative pressure gradient from fluid communication to the exhaust port opened and the supply port closed). For example, by decreasing the DC current to 0 mA, the output pressure will decay to the exhaust pressure in approximately 30 mS. The output port pressure of the example LPT 10 will necessarily be at the exhaust pressure level, in this State 4, and the electrical power consumption of the example LPT 10 in State 4 is zero due to the application of the 0 mA de-activation current. Upon activation of State 4, the example LPT 10 may transition directly to State 1 when the unlatching action is complete and the de-activation signal is "removed" or made zero (0) mA, which is substantially equivalent to the activation signal at State 1 of the example LPT 10.

In another embodiment, a lower power the operational description is made with reference to the previously described example LPT 10. As now depicted in FIGS. 9B and 9C, in State1, the input signal through the electrical leads is zero (0) mA (i.e. zero power) and the armature 300 of the example LPT 10 is rotated slightly counterclockwise around the Rotation Axis R when viewing to FIG. 2 so that a small air gap is produced between a planar surface 113 of the coil 130 and the armature 300 (i.e. non-adjacent to the planar surface 113). In the disclosed example the air gap is approximately 0.0055 inches. The counterclockwise rotation is cause by a moment produced by the bias spring force and the gap is limited by an adjustment of the supply nozzle 220, which serves as a travel stop of the additional counterclockwise rotation by the armature 300. In State1, the orifice of the supply nozzle 220 is contacted or capped by the armature capping portion 340 and the orifice 262 of an exhaust nozzle 230 is opened by a gap between the exhaust nozzle 230 and the capping portion 340 of the armature 300. The pressure at an output port 245 of the example LPT 10 is fluid communication with the exhaust port 235 in State 1, and as such, will decrease to the exhaust pressure level, such as atmospheric pressure resulting in a quiescent fluid flow, as illustrated by flow arrows depicted in FIGS. 2 and 4, through the example LPT 10 that will be zero (0) or substantially zero (0). The pressure of the output port 245 will necessarily be at the exhaust pressure level in this operational State 1 and will remain latched at such pressure due to a latching force created by the E-clip portion 380 until a non-zero electrical input signal is supplied to the electrical leads. The electrical power consumption of the example LPT 10 in State1 is zero (0) mW or a "zero power" condition since no electrical power is applied. That is, in comparison to continuous, proportional transducers, the example LPT 10 modulates both supply nozzle 220 and exhaust nozzle 230 in an opposing or alternating manner that substantially eliminates quiescent bleed flow (i.e. a constant bleed of supply air) through the example LPT 10.

As previously explained, to affect a change in the output pressure, the example LPT 10 must transition from State1 to State2. That is, State2 of the example LPT 10 is a transition state and is produced by applying a non-zero Direct Current (DC) signal or non-zero power to the electrical leads of the coil 130 thereby energizing or activating the example LPT 10. As a DC current, such as +6 millampere (mA) as a 15 mS pulse waveform, is applied to the coil 130, a magnetic field is established thereby magnetizing the core 114 and a sleeve of the example LPT 10 formed by the annular travel stop 152, which produces a magnetizing force (i.e. an attractive force) immediately adjacent to the armature 300. As the DC current is applied, magnetic force may become sufficient to overcome or exceed the sum of a spring moment of the armature 300 formed by the E-clip portion 380 described above and a contact moment of the supply nozzle 220, which cause the armature 300 to rotate with respect to Rotation Axis, R. Relative to FIG. 2, the armature 300 will rotate in a clockwise direction. Armature rotation will continue until the armature 300 makes contact with annular travel stop 152 (i.e. immediately adjacent to the planar surface 113). The electrical power consumption in State 2 is non-zero due to the application of the 6 mA activation current.

Upon application of State 2 activation signal and the resulting transition to a new output pressure state, the example LPT 10 transitions to operation State 3. In this embodiment, State 3 is maintained with a lower input signal, as compared to the embodiment illustrated in FIG. 9A. That is, a reduced holding current of approximately 1.00 mA is sufficient to keep the armature 300 latched and State 3 maintains the output pressure of the output port 245 at substantially supply pressure.

The final operational condition is State 4, which corresponds to changing the pneumatic output from supply pressure to exhaust pressure (e.g. atmospheric pressure). To initiate a transition from State 3 to State 4, the magnitude and "direction" of the DC current must be changed. That is, the DC current is reduced with respect to the DC current applied in State 2 and 3. In general, as the DC current, such as 0 mA, is applied to the coil via the electrical leads, a magnetic field established around the coil is removed and the armature spring and bias spring overcome the remanence established in State 2 thereby de-energizing or deactivating the example LPT 10. As the remanence is overcome in the electromagnetic circuit, the spring moment described above drives the armature 300 in a counterclockwise direction relative to the Rotation Axis, R. The armature 300 moves in that relative direction until to contacts a travel stop formed by a distal end 250 of the supply nozzle 220 effectively capping off or closing the supply port. In State 4, the pressure in the output chamber and therefore the output port 245 decays to the exhaust pressure (i.e. flow induced by a negative pressure gradient from fluid communication to the exhaust port opened and the supply port closed). For example, by decreasing the DC current to 0 mA, the armature will move to the unlatched position in approximately 30 ms.

The output port pressure of the example LPT 10 will necessarily be at the exhaust pressure level, in this State 4, and the electrical power consumption of the example LPT 10 in State 4 is zero due to the application of the 0 mA de-activation current. Upon activation of State 4, the example LPT 10 may transition directly to State 1 when the unlatching action is complete and the de-activation signal is "removed" or made zero (0) mA, which is substantially equivalent to the activation signal at State 1 of the example LPT 10.

In yet another embodiment, the time to transition from State 3 to State 1 (i.e. State 4) can be reduced with much improved repeatability by providing a input signal pulse of negative polarity. For example, as shown in FIG. 9C, a pulse of −1.0 mA and 5 ms in duration will move the armature to the unlatched position in approximately 3 ms with much less time variation than anticipated in the previous embodiment utilizing a 0 mA signal. 1.00

Figure 10:
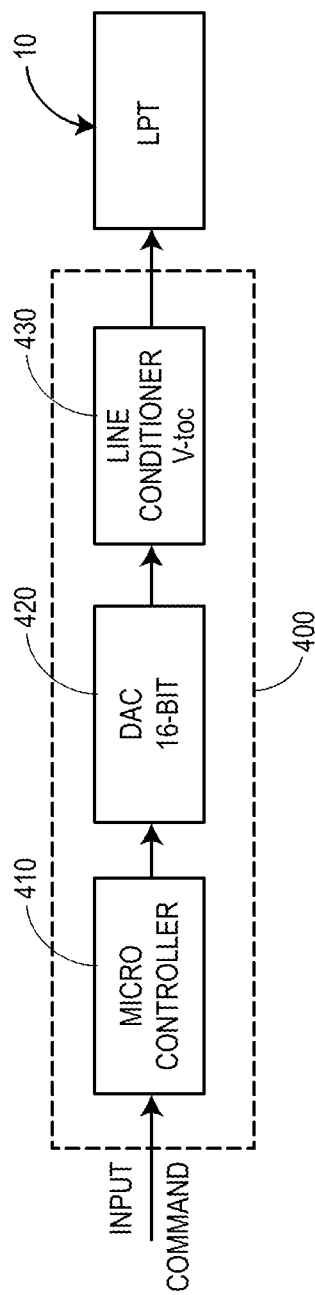
FIG. 10 is a schematic illustration of an example control module operating an example transducer constructed in accordance with the principles of the present disclosure.
Figure 11A:
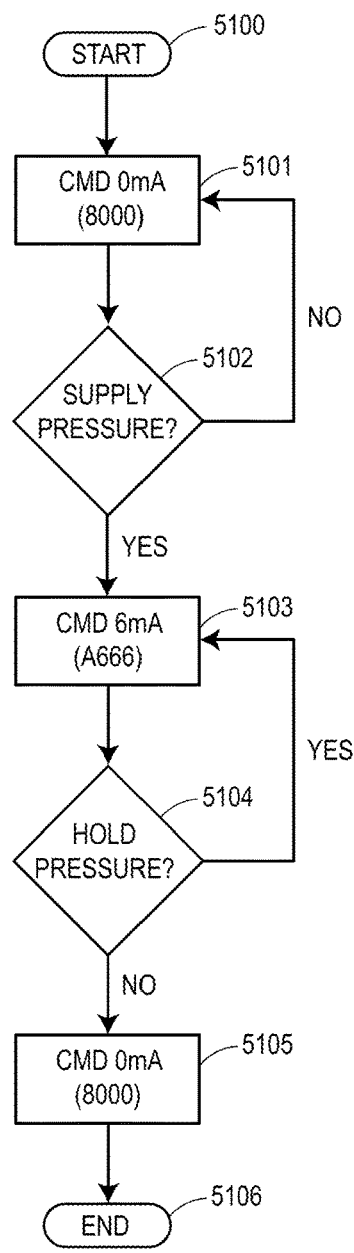
FIGS. 11A and 11B are example flowchart diagrams of the control logic of a control module for an example transducer constructed in accordance with the principles of the present disclosure.
Figure 11B:
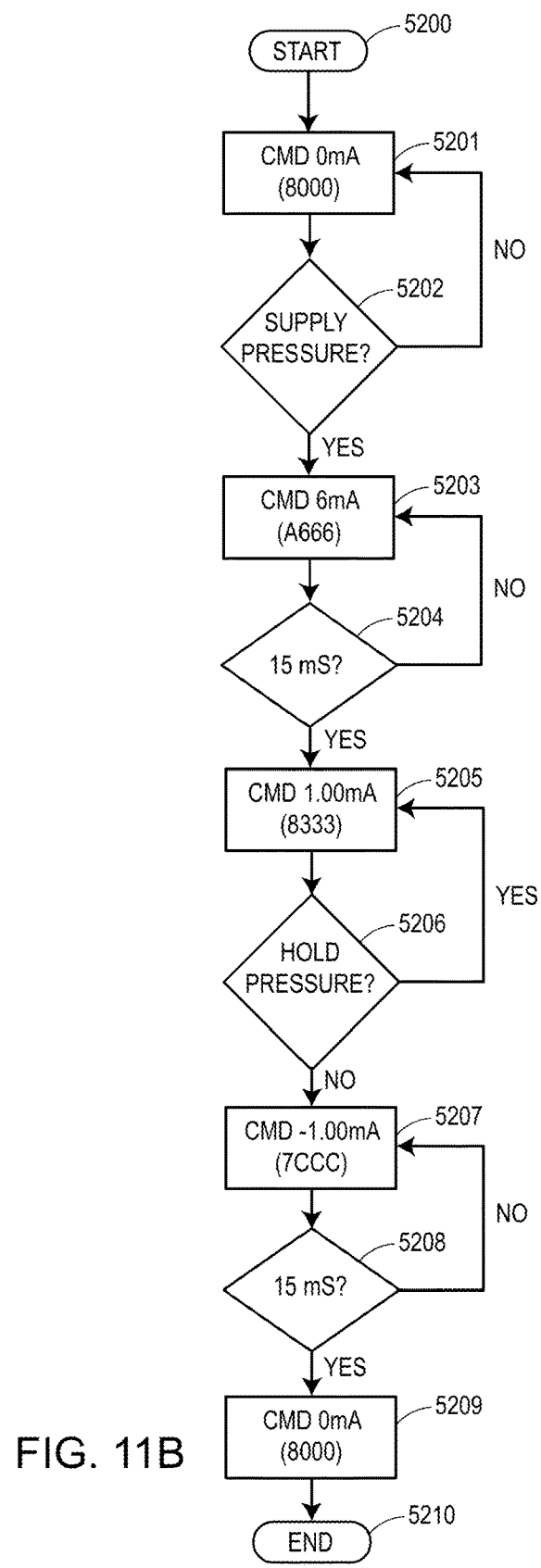

FIGS. 10, 11A and 11B depict an example control module and logic diagrams to create the control signals for the example LPT 10. Referring now to FIG. 10, a control module 400 will be described. The example LPT 10 is operated by conventional electronic means. The control module 400 is provided to process an input signal from a control circuit, such as a position control circuit receiving position feedback on a conventional pressure actuator coupled to a control valve (not shown). As understood by one of ordinary skill in the art, the input signal may be derived from a servo algorithm to command the pressure output of the example LPT 10 to achieve a desired position or set point commanded by the servo. The example control module 400 includes the following components: a microcontroller 410, a digital-to-analog converter (DAC) 420, such as a 16-bit DAC, and a voltage-to-current line conditioner 430. In operation, an input command signal may be provided to a microcontroller 410 that modifies or interprets the command to activate (energize) or de-activate (de-energize) the example LPT 10. Based upon the previous description and example actuation profiles, an activation profile to energize the example LPT10 is illustrated in Table A of FIG. 10 and logic flow FIG. 11A. That is, to activate the example LPT 10 the input command is interpreted by the microcontroller 410. The microcontroller 410 generates a digital command to the DAC 420 that converts the digital command to analog signal representative of such signal. The analog output of the DAC 420 is coupled to the voltage-to-current line conditioner 430 which transforms the representative voltage signal to a representative DC current signal that drives the example LPT 10.

Figure 9A:
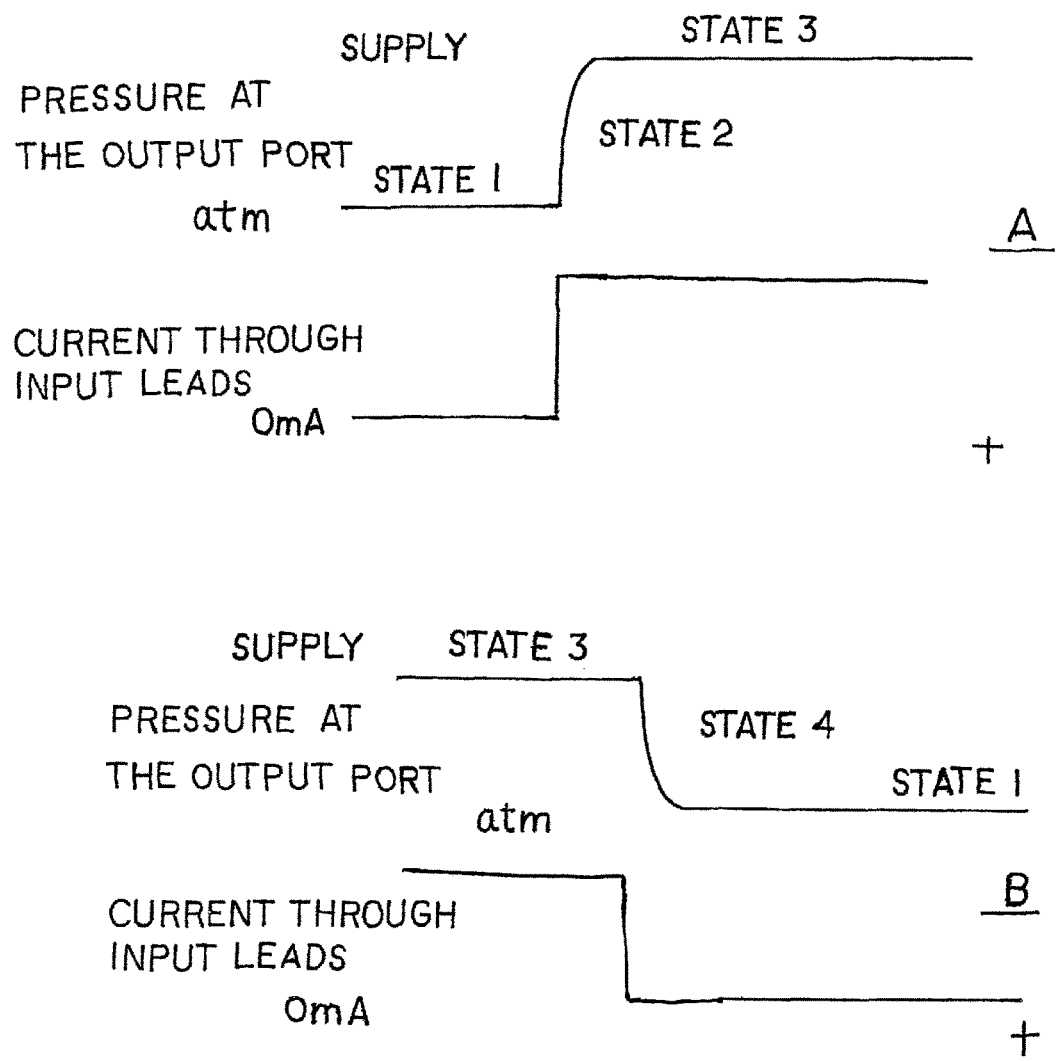
FIG. 9A is an illustration of an actuation profile of an example transducer constructed in accordance with the principles of the present disclosure.

For example, as depicted in FIG. 11A for the operational mode depicted in FIG. 9A, a subroutine in the microcontroller 410 is initiated when the command signal request occurs, step S100. To generate an activation pulse or signal for the example LPT 10, the microcontroller 410 generates a digital signal representative of 0 mA (i.e. commanding $8000_{16}$ from Table A), step S101, which maintains the current state of the example LPT 10, such as State 1. To generate the +6 mA activation signal, the microcontroller 410 generates a digital signal representative of +6 mA (i.e. commanding $A666_{16}$ from Table A), step S102, and conditionally maintains that output for as long as the output pressure is desired to remain at supply pressure, step S104, inducing State 2 of the example LPT 10. When the output pressure of LPT 10 is desired to return to the exhaust pressure, the microcontroller 410 generates a digital signal representative of 0 mA (i.e. commanding $8000_{16}$ from Table A), step S105, which maintains the current state of the example LPT 10, such as State 3, step S106.

Figure 9B:
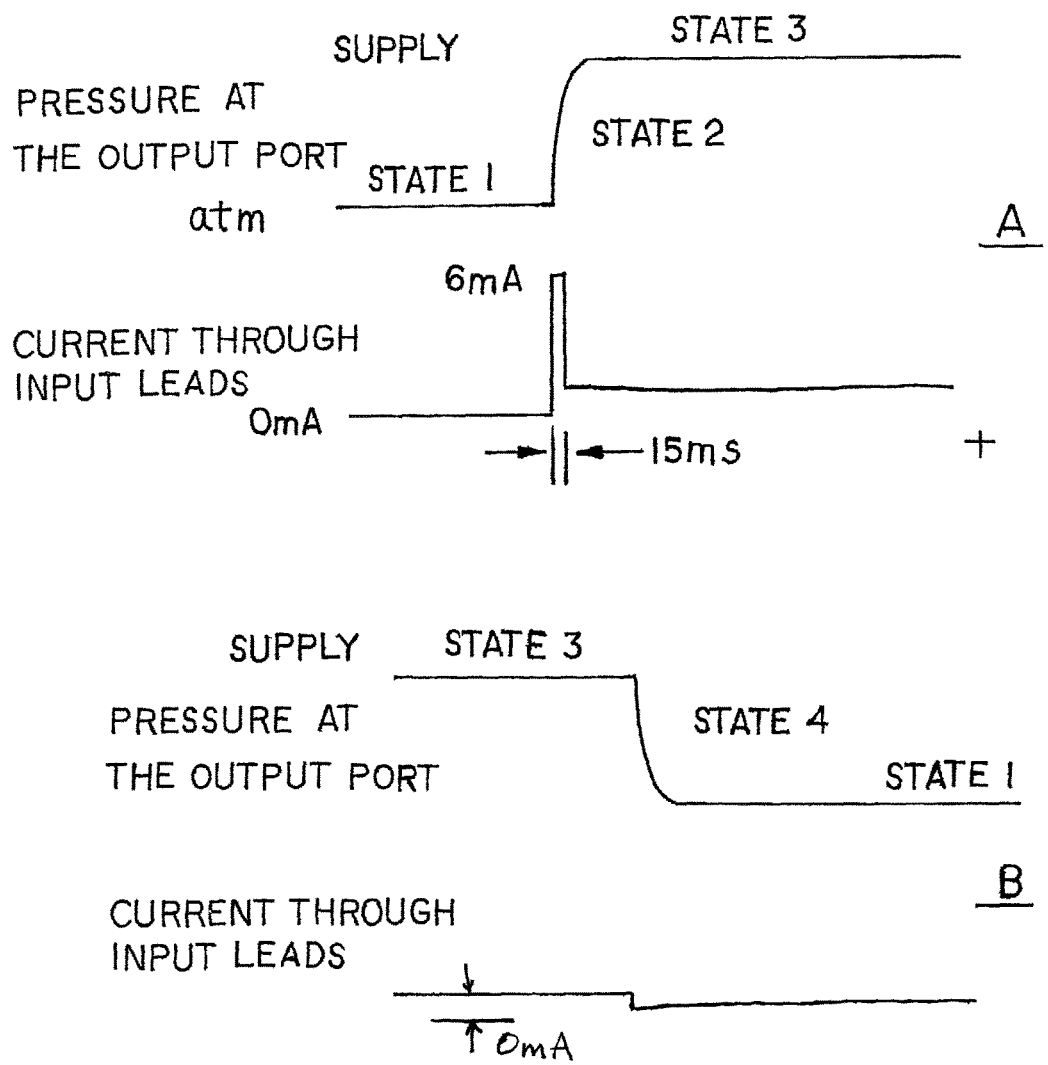
FIG. 9B is an illustration of an actuation profile of an example transducer constructed in accordance with the principles of the present disclosure.
Figure 9C:
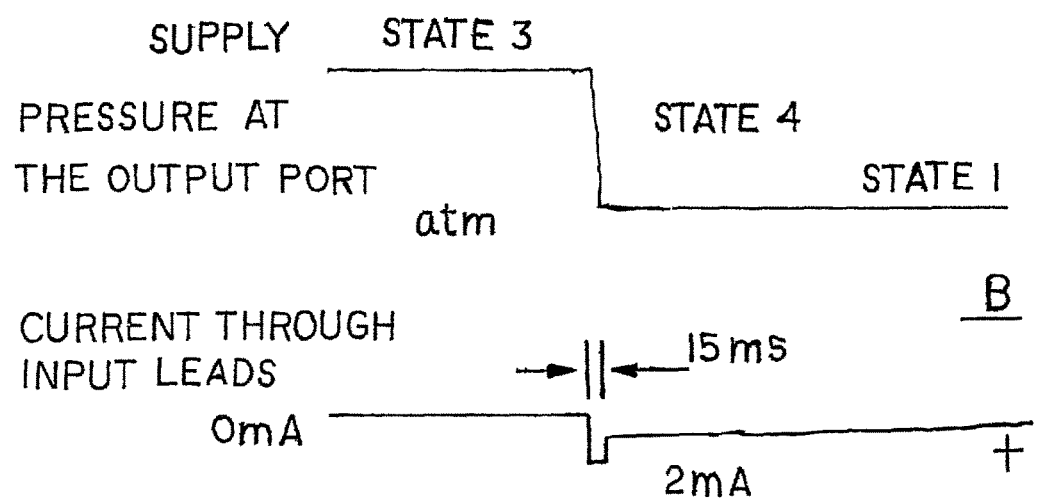
FIG. 9C is an illustration of an actuation profile of an example transducer constructed in accordance with the principles of the present disclosure.

Continuing, as depicted in FIG. 11B, a low power operational scenario from FIGS. 9B and 9C is shown. Starting from State 1, the microcontroller 410 generates a digital signal representative of 0 mA (i.e. commanding $8000_{16}$ from Table A), step S201. If pressure is desired to be at supply pressure, step S202 the microcontroller 410 generates a digital signal representative of 6 mA (i.e. commanding $A666_{16}$ from Table A), step S203, and conditionally maintains that output for 15 ms, step S204 inducing State 2 of the example LPT 10. Upon expiration of the 15 ms activation time, the microcontroller 410 generates a digital signal representative of 1.00 mA (i.e. commanding $8937_{16}$ from Table A), step S205, which maintains the current state of the example LPT 10, such as State 3, step S206. The lower holding current reduces the power consumption of the LPT 10 by a factor of 17. That is, the power consumption of the operational mode depicted in FIG. 11A is $I^2R = 6$ mA$^2$*600 ohms or 21.6 mW versus FIG. 11B $I^2R = 1.00$ mA$^2$*600 ohms or 1.24 mW.

Lastly, the operational mode depicted in FIG. 11B also illustrates commands that improves the response of the LPT 10 by decreasing the output pressure decay time. When the output pressure is no longer desired to be at the supply pressure, S206, the microcontroller 410 generates a digital signal representative of −1.00 mA (i.e. commanding $76C9_{16}$ from Table A) to transition to State 4 and conditionally maintains that output for 15 mS. Upon expiration of the 15 ms activation time, S208, the microcontroller 410 generates a digital signal representative of 0 mA (i.e. commanding $8000_{16}$ from Table A) to return the LPT 10 to State 1.

The example LPT costs less to manufacture than the piezoelectric valves and has a lower temperature limit than the temperature limit associated certain piezoelectric bimorph designs. The example LPT can operate at approximately +85 Celsius to −60 Celsius due to matching thermal expansion co-efficient of the upper housing, the lower housing, the supply nozzle, the exhaust nozzle and the armature. Also, the example LPT is substantially more reliable in industrial environment, including moisture tolerance, due to passivation of exposed surfaces.

Additionally, the example LPT can operate on pneumatic supply pressures in a range of approximately 20 psig to 150 psig. As a result of full supply pressure range capability, no additional supply pressure regulator is required to regulate the pressure source applied to the example LPT. Furthermore, traditional transducer designs use a pneumatic circuit composed of a single modulated exhaust valve fluid connected to a fixed diameter supply orifice. Such a configuration modulates exhaust flow against the supply flow that is communicated through the fixed diameter orifice. Such throttling requires a specific quiescent (i.e. non-zero steady state) flow through both modulated and fixed restrictions, which increases air consumption. The example LPT alternately modulates fluid flow through the supply nozzle and the exhaust nozzle to substantially eliminate constant, quiescent flow through the transducer.

As previously stated, the electrical power consumption required to maintain the pneumatic circuit of example LPT in a low output state is zero (0) mW and is dependent on the hold current utilized when in State 3, lastly, the supply and exhaust port connections may be reversed to provide a reverse-acting mode for the example LPT. This capability provides additional flexibility in instrumentation design where by reversing the pressure connections reduce the need for additional fluid conduit or tubing, thereby providing configurability for direct-acting operation or reverse-acting operation.

Although certain example methods, apparatuses, and articles of manufacture have been described herein, the scope of coverage of this patent is not limited thereto. On the contrary, this patent covers all methods, apparatuses, and articles of manufacture fairly falling within the scope of the appended claims either literally or under the doctrine of equivalents. For example, a coil formed about a bobbin may provide the electromagnet of the upper block assembly. Further, additional magnetic steels or alloys such as Carpenter 49 could be used to provide the electromagnetic circuit without departing from the spirit and scope of the example LPT.

What is claimed is:

1. An electropneumatic transducer comprising:
   a lower block assembly, the lower block assembly comprising a lower housing and a supply nozzle, the supply nozzle in fluid communication with a supply port and in intermittent fluid communication with an output port of the lower housing through an internal fluid passageway, the lower housing further comprising an exhaust nozzle in fluid communication with an exhaust port and in intermittent fluid communication with the output port of the lower housing through the internal fluid passageway; and
   an upper block assembly, the upper block assembly comprising an upper housing, a coil and an armature, the upper housing, coil and armature defining an electromagnetic circuit that provides alternating contact of the armature with the supply nozzle of the lower housing assembly, the electromagnetic circuit being arranged to receive an electrical input signal to latch the output port at a high-output state and unlatch the output port to fail-safe, low-output state in the absence of the electrical signal, the armature further including a plurality of hinges, the hinges providing a spring force moment opposing a magnetic force moment to alternatively latch and unlatch the armature immediately adjacent to and nonadjacent to the upper housing.

2. The electropneumatic transducer as defined in claim 1, wherein the transducer is arranged to alternately modulate fluid flow through the supply nozzle and the exhaust.

3. The electropneumatic transducer as defined in claim 1, wherein the lower housing is further configured to receive a bias spring adjustment screw and the upper housing is further configured to receive a bias spring.

4. The electropneumatic transducer as defined in claim 3, wherein the bias spring and bias spring adjustment screw cooperate to provide a bias spring force to bias the armature of the electromagnetic circuit.

5. The electropneumatic transducer as defined in claim 1, wherein the armature of the electromagnetic circuit is constructed of low magnetic hysteresis material.

6. The electropneumatic transducer as defined in claim 1, wherein the absence of the electrical signal is at least one of a loss of power or a zero-current electrical input signal.

7. The electropneumatic transducer as defined in claim 1, wherein the internal fluid passageway further comprises a pressure chamber, a supply port bore, an exhaust port bore and an output bore.

8. A latching electropneumatic transducer, comprising:
   a pneumatic circuit, the pneumatic circuit comprising a lower housing having a supply port, an exhaust port and an output port in fluid communication through an internal fluid passageway and a pressure chamber;
   an electromagnetic circuit, the electromagnetic circuit comprising an upper housing, a coil and an armature, the armature including a plurality of hinges, the hinges providing a spring force moment and the armature being movable in response to an electrical input signal, the electromagnetic circuit defining a magnetic force moment, the spring force moment and the magnetic force moment act jointly to alternatively latch the armature immediately adjacent to and nonadjacent to the upper housing, the speed of response of the armature increased by application of a negative-current electrical input signal.

9. The latching electropneumatic transducer as defined in claim 8, wherein a supply nozzle is in fluid communication with a supply port and in intermittent fluid communication with an output port through an internal fluid passageway.

10. The latching electropneumatic transducer as defined in claim 8, wherein the transducer can operate on a pneumatic supply pressures in a range of approximately 20 psig to 150 psig.

11. The latching electropneumatic transducer as defined in claim 8, wherein a predetermined thermal expansion coefficient of the upper housing assembly and the lower housing assembly cooperate to provide an operational temperature range of about +85 Celsius to −60 Celsius.

12. The latching electropneumatic transducer as defined in claim 8, wherein the internal fluid passageway further comprises a pressure chamber, a supply port bore, an exhaust port bore and an output bore.

* * * * *

UNITED STATES PATENT AND TRADEMARK OFFICE
CERTIFICATE OF CORRECTION

PATENT NO. : 10,352,474 B2
APPLICATION NO. : 15/639903
DATED : July 16, 2019
INVENTOR(S) : George W. Gassman et al.

It is certified that error appears in the above-identified patent and that said Letters Patent is hereby corrected as shown below:

In the Specification

At Column 1, Line 7, "Transducer"" should be -- Transducer," now Pat. No. 9,726,299. --.

At Column 1, Line 54, "due the" should be -- due to the --.

At Column 4, Line 42, "a fabricated" should be -- fabricated --.

At Column 5, Line 49, "LPT10" should be -- LPT 10 --.

At Column 9, Lines 37-38, "FIG. 1 through 4." should be -- FIGS. 1 through 4 --.

At Column 10, Line 18, "+4 millampere (mA)," should be -- +4 milliampere (mA), --.

At Column 11, Line 45, "power the" should be -- power of the --.

At Column 12, Line 22, "+6 millampere (mA)" should be -- +6 milliampere (mA) --.

At Column 13, Line 18, "a input" should be -- an input --.

At Column 13, Line 45, "LPT10" should be -- LPT 10 --.

At Column 13, Line 46, "logic flow" should be -- logic flow of --.

At Column 14, Line 18, "$8937_{16}$" should be -- $8333_{16}$ --.

At Column 14, Line 31, "$76C9_{16}$" should be -- $7CCC_{16}$ --.

Signed and Sealed this
Twenty-second Day of September, 2020

Andrei Iancu
*Director of the United States Patent and Trademark Office*